United States Patent [19]
Gangnet et al.

[11] Patent Number: 5,694,536
[45] Date of Patent: Dec. 2, 1997

[54] METHOD AND APPARATUS FOR AUTOMATIC GAP CLOSING IN COMPUTER AIDED DRAWING

[75] Inventors: Michel Gangnet, Saint-Germain en Laye; Jean-Manuel Van Thong, Courbevoie, both of France

[73] Assignee: Digital Equipment Corporation, Maynard, Mass.

[21] Appl. No.: 747,295

[22] Filed: Nov. 12, 1996

Related U.S. Application Data

[63] Continuation of Ser. No. 195,724, Feb. 14, 1994, Pat. No. 5,574,839.

[51] Int. Cl.$^6$ .................................................. G06F 15/00
[52] U.S. Cl. .................................................. 395/142
[58] Field of Search .................... 395/133, 140, 395/141, 142, 143; 345/113, 114, 115, 118

[56] References Cited

U.S. PATENT DOCUMENTS

| | | |
|---|---|---|
| 5,168,553 | 12/1992 | Okazaki et al. ......................... 395/143 |
| 5,261,033 | 11/1993 | Oka ........................................ 395/142 |
| 5,337,404 | 8/1994 | Baudelaire et al. .................... 395/141 |
| 5,357,602 | 10/1994 | Ohta ....................................... 395/142 |
| 5,574,839 | 11/1996 | Gangnet et al. ....................... 395/142 |

FOREIGN PATENT DOCUMENTS

0395482  10/1990  France.

*Primary Examiner*—Phu K. Nguyen
*Attorney, Agent, or Firm*—Dirk Brinkman; A. Sidney Johnston; Gary E. Ross

[57] ABSTRACT

Method and apparatus for automatically closing gaps prior to painting a cel in a vector-based computer-aided drawing system. A drawing is processed, as it is entered by a user, to generate a stored planar map containing geometric and topological characteristics of the drawing. The planar map is searched to identify gaps and updated to store synthesized gap-closing vectors for those gaps smaller than a selectable size. The gaps are closed before the painting of the cel, or coloring of the drawing, so as to prevent unintended spill-over of the color into adjacent regions.

2 Claims, 5 Drawing Sheets

METHOD AND APPARATUS FOR AUTOMATIC GAP CLOSING IN COMPUTER AIDED DRAWING

This present invention is a continuation of U.S. patent application Ser. No. 08/195,724, filed on Feb. 14, 1994, now U.S. Pat. No. 5,574,839.

FIELD OF THE INVENTION

The present invention relates generally to computer graphics systems, and more particularly to computer graphics systems having the capability to automatically fill selected drawing areas.

BACKGROUND OF THE INVENTION

Computer systems for graphics applications, such as computer aided drawing or computer animation, allow the generation of a drawing using one of several available input devices or peripherals. Input devices such as a digitizing tablet may be used to generate a drawing. Computer aided drawing systems may use a stylus motion to derive line direction, or trajectory information, and stylus pressure to derive line thickness. Generally, there are two types of graphics systems, one is image based and the other is vector based.

Image based systems store, manipulate and display a drawing as an array of picture elements. The display picture elements are called pixels, and a pixel array, typically stored in memory, is called a pixmap. The pixmap is used by the image display system to "paint" the corresponding pixels on the raster display device. An inherent limitation of an image based system is that the resulting digital image has a fixed, usually limited, spatial resolution, each pixel having a fixed size. Computer graphics systems may also be used to enlarge or shrink a portion of the drawing referred to as, respectively, zooming in or zooming out). In the case of image based systems, a "zoom" transformation is applied to the pixels of the pixmap to generate the corresponding pixels on the screen. When the scale factor of the transformation, i.e. the zoom factor, is less than 1, i.e. zooming out of the drawing, several pixmap pixels are mapped onto one screen pixel, resulting in a reasonable quality image. When the zoom factor of the transformation is greater than 1, i.e. zooming into the drawing, one pixmap pixel is mapped onto several screen pixels, resulting in a coarse, poor quality image. Current commercially available pixel displays have an upper limit on the order of 1024 pixels per line. For applications requiring smooth, high quality drawings, these image based systems are considered to have low resolution. For example, applications for high quality cartoon animation require higher resolution. With adequate high resolution, each drawing, called a cel, could then be reused and resized as necessary in the animation process.

Vector based systems store and manipulate a drawing as a series of vectors, i.e. lines defined by their starting and ending points, in a coordinate system where coordinates are known with good accuracy, typically numbers between −2147483648 and +2147483647 for a 32 bit system. A vector based system is an object oriented system in that the unit of description is a vector, not a pixel by pixel map. This kind of system can accommodate not just straight lines, but any shape line, as curves can be approximated for display or computation purposes to any desired accuracy by appropriate polylines, i.e. a series of vectors. Vectors more accurately represent the strokes forming the drawing because they can maintain the same accuracy under transformation. These vectors can then be displayed on conventional image based display system through a scan converter which produces the best possible image for a given transformation. Zooming in on a portion of the drawing by scaling the dimensions of the vectors in the vector based system does not distort the appearance of the displayed strokes, as would be inherently the case in an image based system. Vector based systems are thus considered to be resolution independent and, therefore, are used when "high" resolution is necessary. These systems are well suited to the animation production process, where it is important to have fine resolution, good quality cels. One of the steps of producing any finished drawing, particularly a cel in the computer aided cartoon animation process, is that of coloring the drawing. A closed region in the displayed drawing is selected by the user through an input device, such as a digitizing tablet or a mouse, and the system is activated to "fill" the selected region with a user selected color.

Image based systems use well known methods for coloring the drawing. One well known technique is referred to as the seed fill method. This method uses a seed pixel pointed to by the user as a starting point to change the pixel to the desired color. It then spreads the color to the neighboring pixels until the region boundaries are found. In image systems, a pixel belongs to the region boundary if its color, prior to modification, is different from the color, also prior to modification, of the seed pixel. When this method is applied on pixmap images of traditional size of 1024×1024, the number of pixels that need to be visited is limited to a maximum of 1048576 (when the area to color covers the entire display screen).

Vector based system are more difficult to handle, as the seed fill method becomes impractical, since it would have to be implemented on a very large pixmap of size 4294967295×4294967295. For vector based systems, it is necessary to know the vector description of the closed region which must be colored. Computing the description of the closed colorable region from an arbitrary series of vector strokes entered by an artist can be done with a method that derives the topology of a drawing from its geometry by computing the intersection of the vector strokes and processing the result. Such a method is described in the following article: Gangnet M., Herve' J-C., Pudet T., Van Thong J-M., "Incremental Computation of Planar Maps", SIGGRAPH '89 Proceedings, Addison-Wesley (1989). A planar map is a data structure generated from the geometric description of the various line paths, i.e. the strokes entered into the drawing by the user, which also further contains information describing intersection points (vertices), edges (the portion of a line path between two vertices), and regions (the sequence of edges describing a closed region). The article above describes how to derive the latter information from the former. A known vector based graphics system utilizing a planar map to iteratively insert and erase portions of a drawing, and color selected regions, is described in U.S. patent application Ser. No. 07/513,247, filed on Apr. 20, 1990, and corresponding European Patent Document 0 395 482 A1.

Figure 2A:
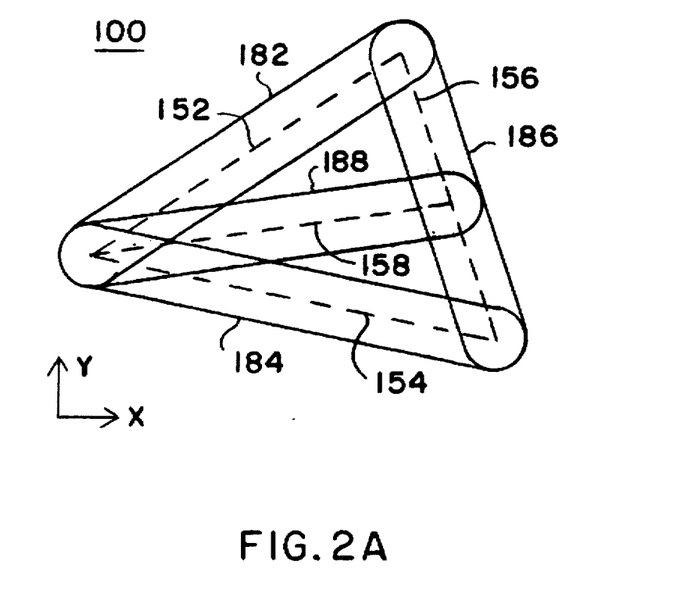
FIGS. 2A–2E show a representative portion of a computer aided drawing during various stages of the method implementing the present invention.
Figure 2B:
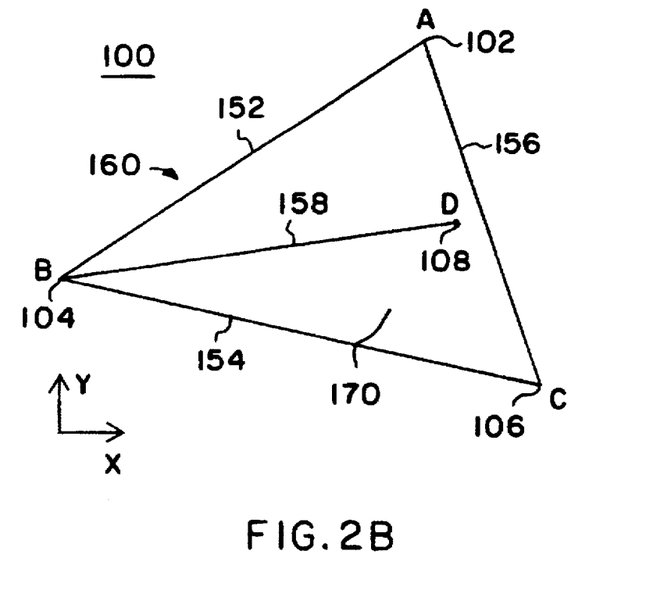

However, one problem that still remains is that it is almost always necessary to edit the drawing, and the corresponding planar map, to avoid color leakage resulting from unintended and unwanted gaps between the user entered strokes. These unintended gaps are the result of hand drawn lines which might only appear to intersect other lines at the resolution used to display them, as the user draws them. As shown in FIGS. 2A–B, this is the case particularly when the drawing strokes have been drawn with a variable width pen and the region boundaries have been computed and stored as the stroke center lines. In this case, the center lines might not intersect at their endpoints, though the stroke outlines might, making it difficult for the user to see exactly where the gaps may exist. These unintended gaps are usually found by the user when a seemingly closed area is painted and the paint spills over to an adjacent area through an unintended gap. This forces the user edit the drawing to eliminate these gaps. The user then must either overcompensate by retracing some of the strokes suspected to produce the non-intersecting lines, or searching for these gaps by zooming and panning the drawing. This correction process not only adds tedious and time consuming steps, but may also adversely affect the graphic quality of the drawing.

SUMMARY OF THE INVENTION

The present invention solves in an efficient way the paint spill-over problem caused by the presence of accidental gaps. This is done by automatically finding and closing gaps in smaller subsets of a selected drawing, thus allowing the automatic painting of closed regions by the conventional pointing and clicking method. This is implemented in a computer based process which finds the unintended gaps in a corresponding planar map and updates the planar map to add appropriate synthetic line segments to close the found gaps, such that the new closed regions become those intended by the user.

In accordance with a first embodiment of this invention, there is provided a method of editing a computer generated drawing to close unintended gaps, the drawing being stored in a storage device as a plurality of digital data elements corresponding to user-provided drawing stokes. This is accomplished by iteratively storing input drawing strokes as a series of elements in the storage device, selecting from the storage device a stored element whose characteristics indicate a gap between the stored element and other stored elements, if any. If a gap is so found, the method continues by processing only those stored elements corresponding to input strokes within a selectable region of said gap in order to synthesize one or more connecting elements for closing the gap, and updating the storage device by inserting the one or more connecting elements in the storage device.

In another embodiment of the invention, there is provided a method of operating a computer system, including a database storage element, comprising the steps of storing selected input vector signals in a database, including geometric and topological characteristics of the vector signals, selecting from the database a stored vector signal whose characteristics indicate a gap between the stored vector signal and other stored vector signals, if any, if a gap is so found, synthesizing at least one connecting vector to close said gap, and updating the database by inserting the at least one connecting vector, including its geometric and topological characteristics, in the database. The process may also continue by displaying on a display device a drawing corresponding to the input and synthesized vectors, including corresponding geometric and topological characteristics stored in updated database.

Preferably, the process described above implements the synthesizing step by inserting in the database geometric and topological characteristic corresponding to a predetermined stamp, the stamp being centered about the gap, synthesizing, within coordinates corresponding to geometric and topological characteristics of stamp, connecting vectors as necessary to close the gap, inserting geometric and topological characteristics of the connecting vector in the database, and finally removing from said database geometric and topological characteristics of said predetermined stamp. A display of the drawing may then be generated, on a display device, corresponding to the geometric and topological characteristics stored in the database.

Preferably, the gaps are found by processing the vector signal characteristics, which include vector vertices and vector edge coordinates, to locate, as a gap indicating vertex, a vertex of one of any unconnected vector edges. Additional gaps are found by processing the vector signal characteristics to locate, as a gap indicating vertex, a point among the local maximum portion of a polyline corresponding to one of the vector signals. The preferred shape for the stamp is that of a simple polygon that encloses the gap.

This process may be used prior to filling in a selected region of a drawing, such as may be done in painting the drawing.

In another embodiment of the invention, there is provided a computer executed method of automatically editing a computer-aided drawing for closing unintended gaps, the drawing being stored in a database referred to as a planar map, the planar map having fields containing geometric and topological data corresponding to a vectorized representation of user-provided strokes, each stroke represented by one or more vectors, the data including vertex and edge coordinates for each vector and corresponding components and regions identification, the method comprising the steps of: searching said planar map to find a point corresponding to a gap; inserting in the planar map vector data corresponding to a polygon P centered on the gap-corresponding point; for every region R interior to the polygon, initializing a vector set S and processing the components found inside the stamp P, excluding the vectors forming the polygon, to build the set C of connected components found within each region; then, if C has zero or one element, processing the next region in R, if any; otherwise, synthesizing at most (n−1) connecting vectors, where n is the number of components initially found in the region, such that the components originally found in the regions form a single maximally connected component, and entering the connecting vectors in said planar map; and removing the vector data for P from planar map. A drawing may then be displayed, on a display device, corresponding to the geometric and topological data stored in the planar map Preferably, the connecting vector synthesizing step comprises the steps of: connecting each component found in the region to another of the components; storing the shorter connecting vector in said planar map; and repeating the connecting and storing steps until only a single component remains.

In a further embodiment of the invention there is provided apparatus for editing a computer-aided drawing stored in a computer graphics system. The apparatus comprises: means for storing selected input vector signals in a database, including geometric and topological characteristics of the vector signals; means for selecting from the database a stored vector signal whose characteristics indicate a gap between the stored vector signal and other stored vector signals, if any; means for synthesizing, if a gap is so found, one or more connecting vectors to close said gap; and means for updating the database by inserting the one or more connecting vectors, including their geometric and topological characteristics, in the database. Such apparatus may also comprise means for displaying a drawing, on a display device, corresponding to the input and synthesized vectors, including their corresponding geometric and topological characteristics stored in the updated database.

Preferably, the apparatus for implementing the synthesizing means comprises: means for inserting in the database geometric and topological characteristic corresponding to a predetermined stamp, the stamp being centered about the gap; means for synthesizing, within coordinates corresponding to geometric and topological characteristics of the stamp, at least one connecting vector in the gap; means for inserting geometric and topological characteristics of the at least one connecting vector in the database; and means for removing from the database geometric and topological characteristics of the predetermined stamp.

DETAILED DESCRIPTION

Figure 1:
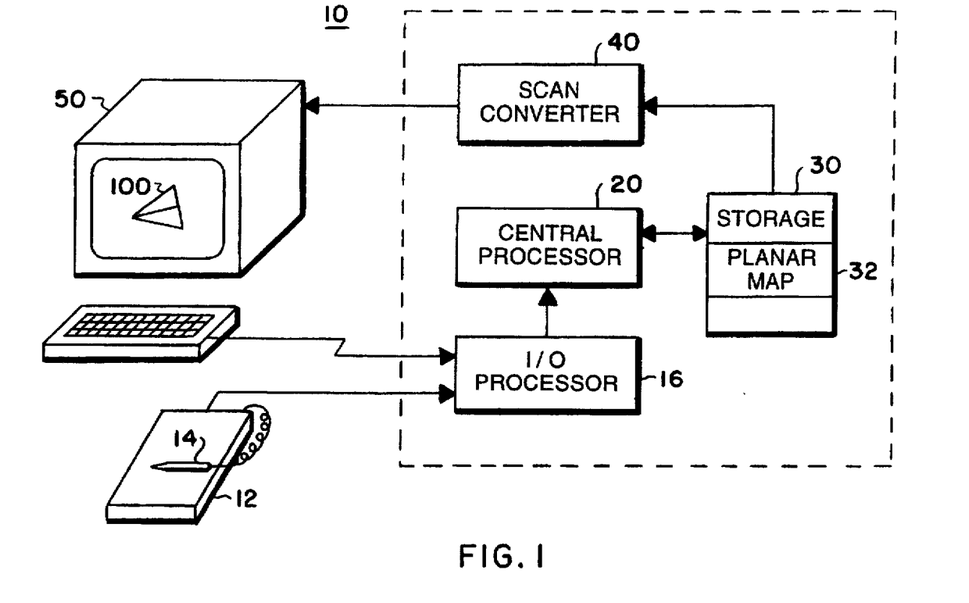
FIG. 1 shows a diagrammatic view of the system of the present invention.

Referring now to FIG. 1, there is shown a vector based graphics system which may utilize the present invention. A user at graphics workstation 10 may input a drawing into the system by using a suitable input device such as graphics tablet 12. The strokes are created by the user with a stylus 14 on graphics tablet 12. The strokes are digitized and passed through I/O processor 16 to central processor 20. Central processor 20 processes the digitized strokes, as will be explained in more detail later, and, in response to each stroke, updates a planar map 32 representing the geometric and topological information of all the strokes entered since the beginning of the current drawing session. Central processor 20 also stores the planar map in a storage 30.

As may be appreciated, other well known input devices may be used to generate the stroke data. For instance, a mouse, joystick or keyboard could be used by a user to produce the desired drawing.

As is known in the art, planar map 32, stored in memory 30, contains a description of each of the strokes, their intersections, and any resulting regions defined by the strokes. Planar map 32 is also used by scan converter 40 to drive a display device 50. Display device 50 is a traditional raster display. Scan converter 40 utilizes well known techniques to transform the vector data stored in memory 30 to pixel data required by the raster display. See, for example, the one described in the reference implementation of the X library available from the X Consortium (Massachusetts Institute of Technology) and also described in the book X Window System—C Library and Protocol Reference, XWindow System, by Robert W. Scheifler, James Gettys and Ron Newman, Digital Press, 1988.

Referring now to FIG. 2A, there is shown an example of a portion of a drawing 100, such as may be entered by a user and appear on display device 50. The user may actually enter bold strokes, for example by using a variable width pen, as shown by the area inside outlines 182, 184, 186 and 188. However, the strokes are stored and manipulated by the system as vectors corresponding to the stroke's center lines 152, 154, 156 and 158, and associated thickness data. It should be noted that the drawing 100 may be as complex as desired, since any curve can be approximated as a collection of straight line segments referred to as polylines, as is well known in the art, for instance by using Bézier polygonal approximation (also called flattening). However, for purposes of illustration, we will focus on the sample drawing of FIG. 2A, and in particular to the drawing represented by its center lines 152, 154, and 156, and with center line 158 almost intersecting line 156, as shown more clearly in FIG. 2B.

Figure 3:
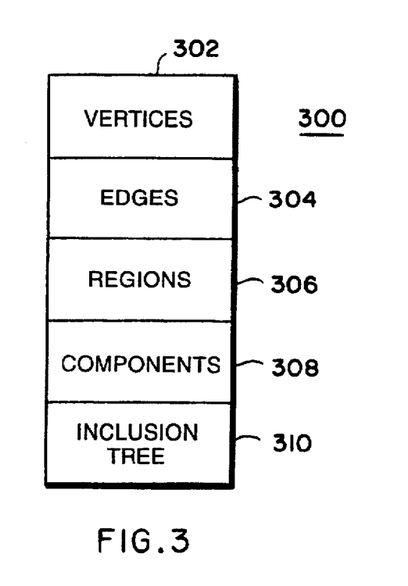
FIG. 3 shows the data structure for a planar map.

As is known in the art, planar map 32 may contain a number of data fields that identify the geometry and topology of the drawing. Fields 302, 304, 306, 308, and 310 are shown in FIG. 3.

Field 302 may contain, for example, a list of vertices created by the strokes entered in the drawing session corresponding to the illustrative triangular portion of drawing 100 of FIG. 2B, i.e vertices A 102, B 104, C 106, and D 108. The vertices may be identified by corresponding x,y coordinates in a reference x-y coordinate system.

Field 304 may contain a list of the resulting edges in this triangular portion, i.e. the set of edges AB 152, BD 158, BC 154 and CA 156. Note that edge BD 158 may be referred to as "dangling" as one of its endpoints is not shared by any other edge.

Field 306 may contain a list of corresponding regions in this illustrative drawing, i.e. the background region outside the path formed by edges BA 152, AC 156 and CB 154, and the region inside the path formed by edges AB 152, BD 158, DB 158, BC 154 and CA 156.

Field 308 may contain a list of corresponding components in this illustrative portion. A component is defined as a set of connected edges. This illustrative portion contains a single component 160, i.e. the component formed by edges AB 152, BD 158, DB 158, BC 154 and CA 156.

Field 310 may contain a corresponding inclusion tree, which defines the ordering of components and regions. The inclusion tree has as its root the background region, which extends to infinity and which may contain one or more components. In turn, each component contains zero, one, or several regions, which may further contain other components, etc. This branching process is continued until the region in consideration does not contain any component or the component does not contain any region. In the case of FIG. 3, the inclusion tree contains the background region, a single component 160 (as defined in Field 308) and a single region 170 (as defined in field 306).

Ways of creating a computer aided drawing by using such a planar map and incrementally inserting or deleting user entered strokes in the map are known in the art, and are described, for example, in the "Incremental Computation of Planar Maps" article, supra.

As in a conventional vector based graphics system, such as that of U.S. patent application Ser. No. 07/513,247, and corresponding European Patent Document 0 395 482 A1, supra, a user can start coloring selected areas of the drawing by activating a corresponding coloring process 400 of central processor 20, as shown in step 402, FIG. 4A. A desired color from a palette of available colors may be selected in step 404. A region to be colored may be selected in step 406, via stylus 14 or other input device, by selecting a point within a seemingly closed region for automatic coloring of that region, as is well known in the art. This causes display processor 20, in step 408, to operate on planar map 32 in a conventional manner to find the region being pointed to by the input device. A method of finding the location of the selected point is also described in the "Incremental Computation of Planar Maps" article, supra.

We now turn to the gap-filling process of the present invention. As shown in FIGS. 2A and B, line BD 158 may be the result of a user input stroke intended by the user to intersect line AC 156 of the triangle formed by lines AB 152, BC 154 and CA 156. If the input strokes are broad relative to the overall size of the drawing, line BD 158 may actually appear on the display device to intersect line AC 156. However, the center of the stroke forming line BD 158 may actually end at point 108 and not reach line AC 156. This leaves a gap in the vector representation of the drawing, as shown in FIG. 2B, which fails to form closed regions above and below the line BD 158. Thus, if the user tries to select and paint either part of the original triangle by the known conventional processes, the paint would spill over and fill the entire triangle, not just one of the regions as intended.

With the method and system of the present invention, once the selected region is identified, central processor 20 processes and modifies planar map 32 to synthetically close any unintended gaps and to further simplify the corresponding portion of the drawing. This is achieved, in step 410, by first detecting and closing any unintended gaps in the region, for example by closing the gap between line BD 158 and line AC 156. As could be found in more complex drawings, the closing of the gaps may in turn generate new small regions and small dangling edges. Therefore, in step 412, regions smaller than a preselected feature detection threshold may be merged into larger regions. Then, in step 414, any dangling edge smaller than a predetermined threshold may also be removed from the planar map. These last two steps are useful in eliminating insignificant features of the drawing and thereby simplify later processing of the planar map. Once planar map 32 is so updated, central processor 20 then proceeds, in step 416, to fill the now closed region using a conventional process, as is well known in the art. For example, one could pass the list of edges forming the selected region to the Xlib procedure called XtFillPolygon (see "X Window System: The Complete Reference to Xlib", supra.

Figure 4A:
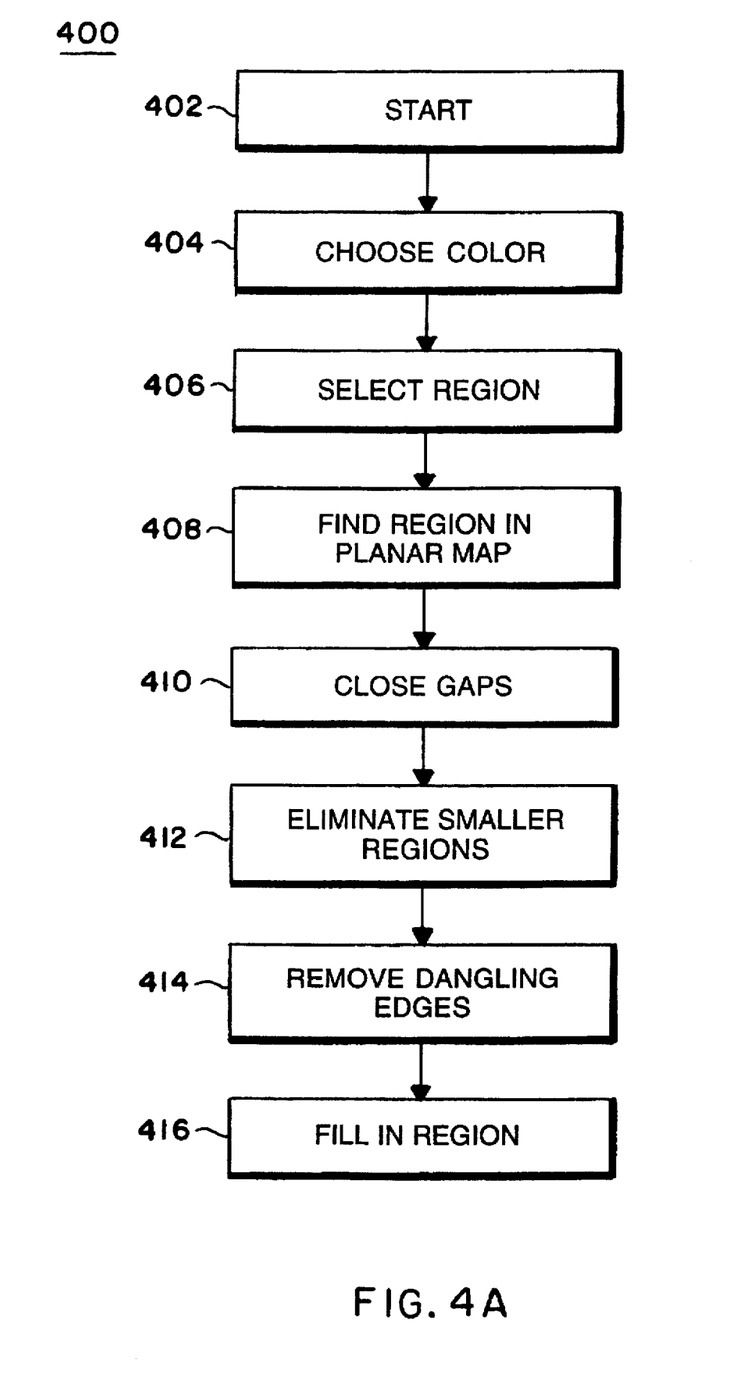
FIG. 4A shows the flow diagram for a computer painting process of the present invention.
Figure 4B:
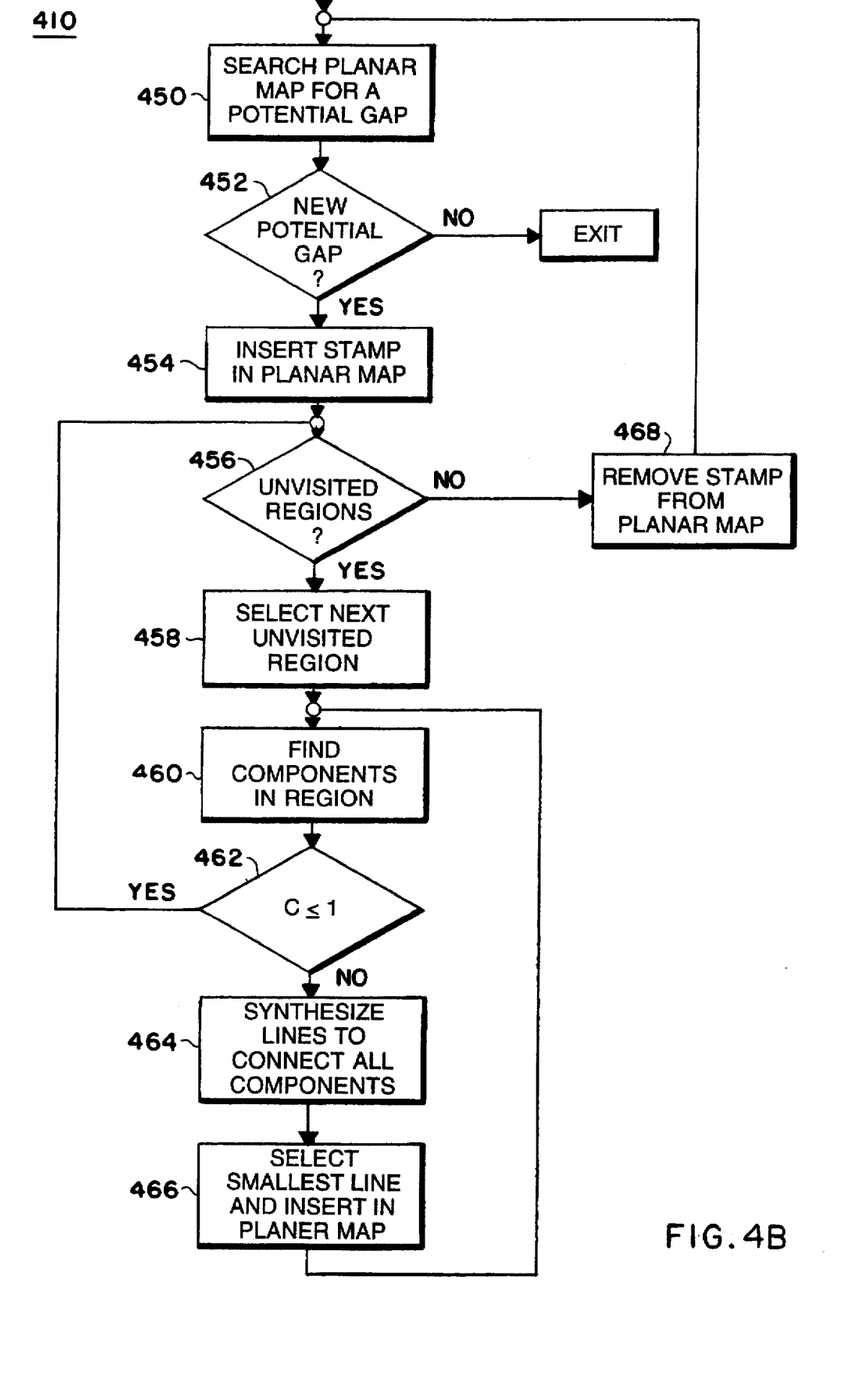
FIG. 4B shows in more detail the flow diagram for the gap closure part of the overall process of the present invention.

More particularly, the gap closing process shown in step 410 of FIG. 4A can be described by the following steps, performed by central processor 20, and shown in the flow diagram of FIG. 4B:

in step 450, search planar map 32 to find a point in the selected region which is a likely candidate for a gap location. This may be done, for example, by searching for all stroke endpoints and all points which are relevant local maxima for the stroke curvature, as explained in more detail later, with a selected threshold value being used to resolve whether a local maximum is to be used or not;

in step 452, a test is made to determine whether a gap exists, and if a gap is not found the process returns to step 412 of FIG. 4A. If a gap indicating point is found, proceed to step 454, to insert in planar map 32 data equivalent to a simple polygon P, referred to as a "stamp", centered on the selected point, the stamp having a size bigger than a selectable threshold gap size;

in step 456, check to see if there are regions within stamp P that need to be processed. On the first pass, there should be at least one region, but on subsequent passes, when all the existing regions within the inserted stamp have been visited the process proceeds to step 468 to remove the current stamp from the planar map 32. At this point the process then returns to step 450 to process another gap, if it exists;

in step 458, reached upon finding an unprocessed region within the stamp P, select the next available region for further processing;

in step 460, process the edge portions found inside the region R, excluding the edges of stamp P itself, to build the set C of connected components found inside region. Test at step 462, and if C has zero or one element, return to step 456 to process the next region in P, if any. In other words, once all the connected components are identified for a particular region, if there is only one component, or none, there is no gap that needs closure within this region of the stamp, so move on to the next region. Otherwise, if there are two or more components in the region, one or more gaps need to be closed;

in this case, as shown is step 464, let n be the number of elements in C, generate n(n−1)/2 line segments L connecting the elements of C two by two. In other words, connect each component to other components with synthetic lines until only one "larger" connected component remains. In step 466, select the smallest of the n(n−1)/2 line segments in L and insert it into the planar map 32, then return to step 460 to process the n−1 components left. Repeating this part of the process has the effect of optimizing the gap closure by picking only the shortest synthetic lines necessary to connect the various components originally present in the current region;

once all components are connected in all the regions within the selected stamp, i.e. the test in step 462 finds a single component in each region and all the regions have been visited, the process proceeds to step 468, to remove the stamp from the planar map 32;

then search planar map 32 for a next gap by returning to step 450, and continue the gap filling process. If no more gaps exist in the drawing represented by planar map the test in step 452 returns control to step 412 of FIG. 4A.

Figure 2C:
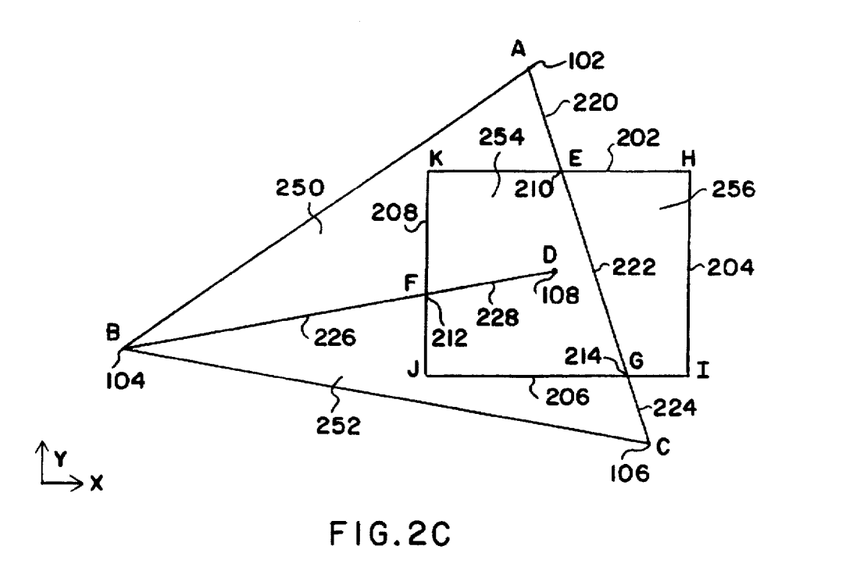
Figure 2D:
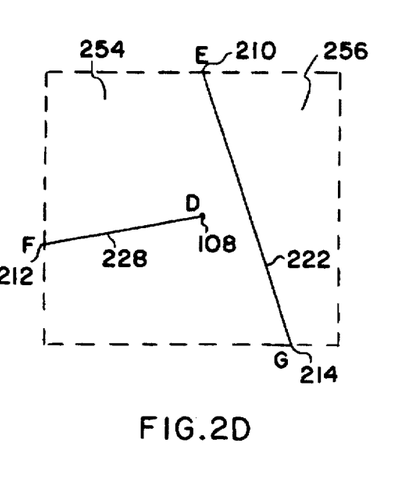
Figure 2E:
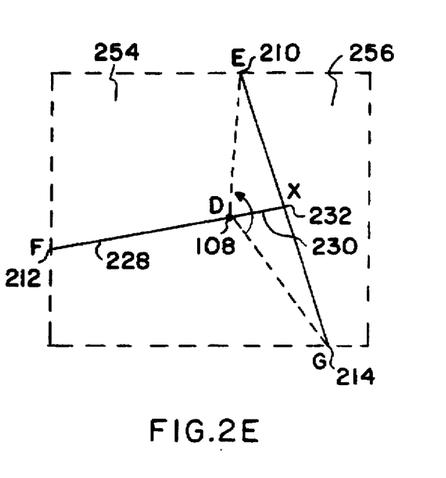
Figure 5:
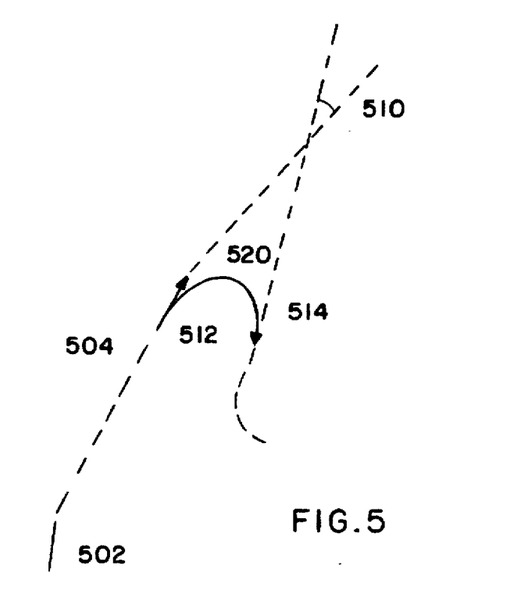
FIG. 5 shows a portion of a drawing illustrating the determination of a local maximum for a curved line.

The gap closing process of step 410 of FIG. 4A, and shown in more detail in FIG. 4B, can be better understood by reference to the illustrative drawing shown being processed in FIGS. 2C, 2D, 2E. First, in step 450, a candidate point for an unintended gap may be identified by finding a relevant stroke endpoint, for example point D 108 in FIG. 2C. Other criteria for finding potential gaps may be used, for instance by selecting a local maximum for each stroke curvature. This may be done by scanning the polylines corresponding to the strokes, as shown in FIG. 5. Starting from an initial vertex 502 of a polyline 504, keep a sequence of contiguous segments such that the sum of their length is less than a selected threshold. If the angle 510 between the first and the last segment (512 and 514, respectively) of the current sequence is narrower than a given angle threshold which may be set by the user, then one of the endpoints of the sequence is a local maximum. Setting the mid point of the sequence, for example 520, as the gap indicating vertex gives satisfactory results.

In step 454, central processor 20 modifies planar map 32 by inserting vector components equivalent to a simple polygon centered on the point found in step 450, see FIG. 2C. This polygon is referred to as a "stamp", because it allows the process to focus on a smaller area of interest and ignore the bulk of the planar map entries. This speeds up the gap closing process, since only a manageable subset of edges needs to be analyzed. Preferably a square is used for this stamp in order to simplify the corresponding vector insertion. The size of sides 202, 204, 206 and 208 of the square is selectable and depends on the desired feature size detection threshold, i.e. the size of the gap that needs to be detected. Synthetic sides 202, 204, 206 and 208 form new edges and regions in planar map 32. For instance, field 302 of planar map 32 now has in addition to the vertices created by the user's strokes, i.e. A 102, B 104, C 106, and D 108, the synthetic vertices created by the inclusion of the square stamp, i.e vertices E 210, F 212, G 214, in addition to the vertices (not shown for simplicity) of the square stamp itself.

New regions are also created, i.e. regions 254, 256 shown in FIG. 2C, and the planar map 32 is updated accordingly.

Field 304 now contains some of the unaffected edges, such as original edges AB 152 and BC 154, and in addition it contains new edges AE 220, EG 222, and GC 224 in place of original edge AC, as well as new edges BF 226 and FD 228 in place of BD (plus the edges corresponding to the polygon stamp, not specifically called out for simplicity).

Field 306 contains the updated list of regions. The original region inside the triangle 170 has been split and replaced by 3 regions 250, 252 and 254 (this last one formed by the path EK, KF, FD, DF, FJ, JG and GE), while the original background region has been split and replaced by 2 regions, i.e region 256 and a new background region 258.

Field 308 contains one larger connected component, i.e. the entire set of vectors shown in the drawing of FIG. 2C.

Field 310, which contains the inclusion tree, is also updated to reflect that the new connected component now contains 4 regions.

The remainder of the process is performed on the selected features inside of the stamp region. This is equivalent to ignoring everything but those planar map entries corresponding to the features shown in FIG. 2D, i.e. edges EG 222 and FD 228.

In steps 456 and 458, region 256 as shown in FIG. 2D, may be selected. In step 460, only one component, segment 222, is found and therefore the process returns to step 458, where the next region within the stamp, i.e. region 254, is selected. In step 460, two components are found, vector segments 222 and 228. We now proceed to step 464, to synthesize line segment 230, as shown in FIG. 2E.

The synthesis of connecting line segments of step 464, may be performed as follows: add a new edge DX 230 going from vertex D 108 to temporary vertex G 214. Start walking edge DX 230 from vertex G 214 toward vertex E 210, while comparing the length of edge DX as it walks from point to point along edge GE. This way the shortest distance from point D to edge EG can be found.

Since in this particular example the set L of synthesized line segments only contains one member, in step 466 we insert vector 230 in the planar map 32. If other components, not shown, were present within the region 254, central processor 20 would repeat the synthesis of other lines to connect all the remaining components. Once all the new connecting lines are found, central processor 20 would select the shortest connecting line found, and reprocess the new set of components, as explained above.

Once new line 230 is entered in the planar map there is only one newly formed component left in region as shown in FIG. 2E. Thus the process now checks, in step 456, for any other unvisited regions within the stamp, and finding none, it proceeds to step 468, where the stamp data is removed from the planar map 32, including all the corresponding temporary vertices, edges and lists created in the process of finding the optimal closure of the gap.

Central Processor 20 now proceeds to step 412, FIG. whereby planar map 32 is processed to find and eliminate data corresponding to regions smaller than a preselected feature detection threshold. This may be done by scanning all regions. For each region, compute its area; if it is smaller than a given threshold, then merge it with an adjacent region by removing one of the edge of its boundary. In addition, central processor 20 in step 414, now finds and eliminates all remaining dangling edges whose length is smaller than the selected feature detection threshold. These steps are optional, but are useful in simplifying the resulting planar map and eliminate unnecessary further processing as the drawing is edited or added to.

While a specific embodiment has been described herein, variations will become apparent to those skilled in the art without departing from the principles and spirit of the invention, the scope of which is defined in the appended claims.

For example, while a square is used as the polygon for the stamp and the choice of endpoints and local maxima are used as the criteria to find the potential gap neighborhoods, different criteria could be applied. Similarly, in order to find a line segment connecting two components, the implementation described above searches for the closest pair of points, but other criteria could be used.

While the method described here identifies the shortest line segment among the n(n−1)/2 segments connecting the components 2 by 2, other methods will be apparent, to those skilled in the art, for merging the components in C into a single component.

It is also possible to use curved geometric elements instead of line segments. In addition, the order of several steps could be altered, for example the insertion of the connecting segments (step 456) and the removal of the stamp from the planar map 32 could be reversed. Furthermore, the gap-filling part of the process could be performed as described, that is pursuant to a specific user entered command, or iteratively as each stroke is entered, since the planar map is generated incrementally. Similarly, the gap-filling process, described as occurring upon selection of a particular region to be colored for purposes of explanation, can be modified to process all gaps in all regions, i.e. to prepare a corrected drawing, prior to the coloring step, and is indeed the preferred mode of operation.

It will also be apparent to those skilled in the art that the method and apparatus of the present invention can be modified to work in an image based system. For instance, given a pixmap and a set of candidate gap indicating points, the system could process a pixel array P centered on each candidate point. First, one of the well known connected component labeling methods could be used to mark the existing pixels in P. Then, if more than one component is found, the closest pixel pair is identified and its elements are connected with a line segment generated in the pixel pixmap. The process repeats until all components are connected, as taught by the method of the present invention.

What is claimed is:

1. A method of editing a computer generated drawing to close unintended gaps, said drawing being stored in a storage device as a plurality of digital data elements, said method comprising the steps of:

storing input drawing strokes as a series of elements in said storage device;

selecting from said storage device a stored element whose characteristics indicate a gap between said stored element and other stored elements, if any;

processing, in response to finding said gap, only those stored elements corresponding to input strokes within a selectable region of said gap in order to synthesize at least one connecting element for closing said gap, and;

updating said storage device by inserting said at least one connecting element in said storage device.

2. An apparatus to edit a computer generated drawing to close an unintended gap in the drawing, comprising:

a storage device;

means for storing said drawing in said storage device as a plurality of digital data elements;

means for storing input drawing strokes as a series of elements in said storage device;

means for selecting from said storage device a stored element whose characteristics indicate a gap between said stored element and other stored elements, if any;

means for processing, in response to finding said gap, only those stored elements corresponding to input strokes within a selectable region of said gap in order to synthesize at least one connecting element for closing said gap, and;

means for updating said storage device by inserting said at least one connecting element in said storage device.

* * * * *